United States Patent
Zang

(10) Patent No.: US 10,739,110 B2
(45) Date of Patent: Aug. 11, 2020

(54) COMPOSITE TELESCOPIC SIGHT, SIGHT MOUNT, AND ELECTROLUMINESCENT DIGITALLY ADJUSTABLE RETICLE

(71) Applicant: KIHO MILITARY ACQUISITION CONSULTING, INC., Vienna, VA (US)

(72) Inventor: Oliver Zang, Leesburg, VA (US)

(73) Assignee: KIHO MILITARY ACQUISITION CONSULTING, INC., Vienna, VA (US)

( * ) Notice: Subject to any disclaimer, the term of this patent is extended or adjusted under 35 U.S.C. 154(b) by 168 days.

(21) Appl. No.: 15/711,613

(22) Filed: Sep. 21, 2017

(65) Prior Publication Data

US 2018/0128576 A1     May 10, 2018

Related U.S. Application Data

(60) Provisional application No. 62/561,001, filed on Sep. 20, 2017, provisional application No. 62/420,307, filed on Nov. 10, 2016.

(51) Int. Cl.
| | | |
|---|---|---|
| *F41G 11/00* | (2006.01) | |
| *F41G 1/38* | (2006.01) | |
| *F41A 17/06* | (2006.01) | |
| *H04W 4/80* | (2018.01) | |
| *F41G 1/34* | (2006.01) | |
| *H04N 5/232* | (2006.01) | |

(52) U.S. Cl.
CPC .......... *F41G 11/004* (2013.01); *F41A 17/063* (2013.01); *F41G 1/345* (2013.01); *F41G 1/38* (2013.01); *F41G 11/003* (2013.01); *H04N 5/23293* (2013.01); *H04W 4/80* (2018.02)

(58) Field of Classification Search
CPC ........ F41G 11/004; F41G 1/38; F41G 11/003; F41G 1/345; F41A 17/063; H04W 4/80; H04N 5/23293
USPC ....................................................... 359/428
See application file for complete search history.

(56) References Cited

U.S. PATENT DOCUMENTS

| | | |
|---|---|---|
| 3,885,861 A | 5/1975 | Farnsworth et al. |
| 4,193,666 A | 3/1980 | Cojan |
| 5,671,088 A | 9/1997 | Mai et al. |
| 5,699,115 A | 12/1997 | Hiraki et al. |

(Continued)

OTHER PUBLICATIONS

International Search Report and Written Opinion of related PCT Application No. PCT/US2017/060819 dated Jan. 18, 2018.

*Primary Examiner* — Jade R Chwasz
*Assistant Examiner* — Rahman Abdur
(74) *Attorney, Agent, or Firm* — Arent Fox LLP

(57) ABSTRACT

A composite scope body having a composite mounting system integrally attached to the scope body. The mounting system may have a self-centering clamping mechanism. Further, a sighting system which may be used in the scope body may include at least one transparent display array for display of a digital reticle. The display array configured to selectively emit light from the array surface. The display may further be integrated with an optical component of the sight or integrated with an optical protection component. The sighting system may further include an adjustment system for adjusting the digital reticle or other information to be displayed on the display.

23 Claims, 15 Drawing Sheets

(56) References Cited

U.S. PATENT DOCUMENTS

| | | | | |
|---|---|---|---|---|
| 7,685,760 | B1* | 3/2010 | Neumaster | F41G 1/01 |
| | | | | 42/111 |
| 9,226,362 | B2 | 12/2015 | Härkönen | |
| 9,290,840 | B2 | 3/2016 | Maula | |
| 2001/0045046 | A1* | 11/2001 | Otteman | F41G 1/38 |
| | | | | 42/136 |
| 2007/0177261 | A1* | 8/2007 | Murdock | G02B 17/0808 |
| | | | | 359/399 |
| 2008/0113215 | A1* | 5/2008 | Kathirgamanathan | |
| | | | | H01L 51/0058 |
| | | | | 428/690 |
| 2011/0023348 | A1* | 2/2011 | Karagias | F41G 11/003 |
| | | | | 42/124 |
| 2011/0280040 | A1 | 11/2011 | Schick et al. | |
| 2012/0000979 | A1* | 1/2012 | Horvath | F41G 1/38 |
| | | | | 235/407 |
| 2012/0113507 | A1 | 5/2012 | Arai | |
| 2012/0151817 | A1 | 6/2012 | Howe et al. | |
| 2012/0168589 | A1* | 7/2012 | Riley | F41G 11/003 |
| | | | | 248/315 |
| 2013/0008071 | A1 | 1/2013 | Haering | |
| 2013/0033678 | A1* | 2/2013 | Natsumeda | B82Y 20/00 |
| | | | | 353/20 |
| 2014/0190062 | A1 | 7/2014 | Turner, Jr. et al. | |
| 2015/0143733 | A1 | 5/2015 | Thomas et al. | |
| 2015/0247702 | A1 | 9/2015 | Davidson et al. | |
| 2015/0253108 | A1* | 9/2015 | Fischer | F41G 3/06 |
| | | | | 42/122 |

* cited by examiner

COMPOSITE TELESCOPIC SIGHT, SIGHT MOUNT, AND ELECTROLUMINESCENT DIGITALLY ADJUSTABLE RETICLE

CROSS-REFERENCE TO RELATED APPLICATIONS

This application is based upon and claims the benefit of priority of the prior U.S. Provisional Patent Application No. 62/561,001, filed on Sep. 20, 2017, and U.S. Provisional Patent Application No. 62/420,307, filed on Nov. 10, 2016, the entire contents of which are incorporated herein by reference.

BACKGROUND

Telescopic sight systems (also interchangeably referred to herein as scope sighting systems or scopes) typically are formed of aluminum, magnesium, or metal alloys that may be machined or cast into a cylindrically shaped scope body; the cylindrical body housing various optical and mechanical components. A telescopic sight is generally mounted to a firearm, or some other mounting point through use of a scope mount. Typical scope mounts include a scope base that may be mounted to a firearm or other object and a plurality of scope rings, which mount to the scope base. The scope rings may have a circular opening corresponding to the outer circumference of the scope body for clamping to the cylindrical scope body.

Scopes generally offer fixed or variable magnification and may include adjustments for windage and elevation. Many scope sighting systems further include a reticle for assisting a user with optical measurement and/or aiming. A reticle commonly consists of a plurality of fine lines, which may be stationary, movable mechanically, or movably projected onto a display field, such as a diffraction grid. Attached U.S. Patent Application Publication 2012/0113507 A1 discloses one example of a reticle formed by light projected onto a diffraction grid, which is incorporated by reference herein. Alternatively, reticles may be electronically produced on a screen projecting a virtual image; the virtual image being may be formed digitally based on a processed signal received from an imaging sensor.

Reticles are most typically located in a focal plane, at a point between the objective lens or lenses and the ocular lens or lenses. An erector lens assembly may further be located between the objective lens or ocular lens, and the reticle may be located between the objective lens and the erector and/or between the erector and ocular lens, depending on if a magnification of the reticle is desired. Reticles may be formed of a wire, etched in a glass or transparent substrate, or may be projected onto or emitted from a display or display field within the scope. Reticles may be viewed in relation to a real image, which may be magnified or enhanced though optics and placement of the reticle in relation to the optics, or may be viewed in relation to a virtual image formed by a processor using light data received by an image sensor. A virtual image may be displayed using a backlit liquid crystal display (LCD) or transmission-type organic light-emitting diode (OLED) display. While the technology of scope sighting systems has improved over the years, a number of shortcomings are still present in the current mounting systems and reticle configurations.

Common problems associated with typical mounting systems include: limitations on scope size and form factor due to a necessity for compatibility with standard ring sizes, corrosion between the scope rings and the scope body or between other mating surfaces in the mount assembly, misalignment of the mounts due to the thermal expansion qualities of different materials, user error in assembling the mounting system, and an increase in complexity and weight of the assembly.

Common reticle systems include many shortcomings, the most common being: failure of the mechanical components required for movement of the reticle, misalignment due to shock or thermal expansion, and an increase in complexity and weight due to mechanical components housed inside the scope body. Further, in projected reticle systems, similar disadvantages exist; along with a further increase in complexity and potential for failure. In reticles that are electronically produced on a screen displaying a virtual image, several of the above disadvantages exist, with the addition of the risk that the failure of the electronic components may result in a black-out and inability to use the scope optics.

SUMMARY

One aspect of the present disclosure relates to a composite or carbon fiber scope body having a mounting system integrally attached to the scope body. The integral mount may further include a clamping portion having a self-centering feature for reducing a lateral shift when mounting the scope to a mounting rail.

Another aspect of the present disclosure relates to a sighting system that includes at least one transparent and segmented digital display capable of emitting light from the display. The digital display may display a reticle and/or other pertinent information. The transparent and segmented electroluminescent display may include a thin film substrate produced on an optical or other transparent component within the scope body. The display or plurality of displays may be located in between the objective lens and the erector and/or between the erector and ocular lens, for example, depending on if a magnification of the reticle is desired. The display may further be integrated with an optical component of the sight or integrated with a transparent optical protection component. The sighting system may further include an adjustment system for adjusting the reticle or other information to be displayed on the display.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
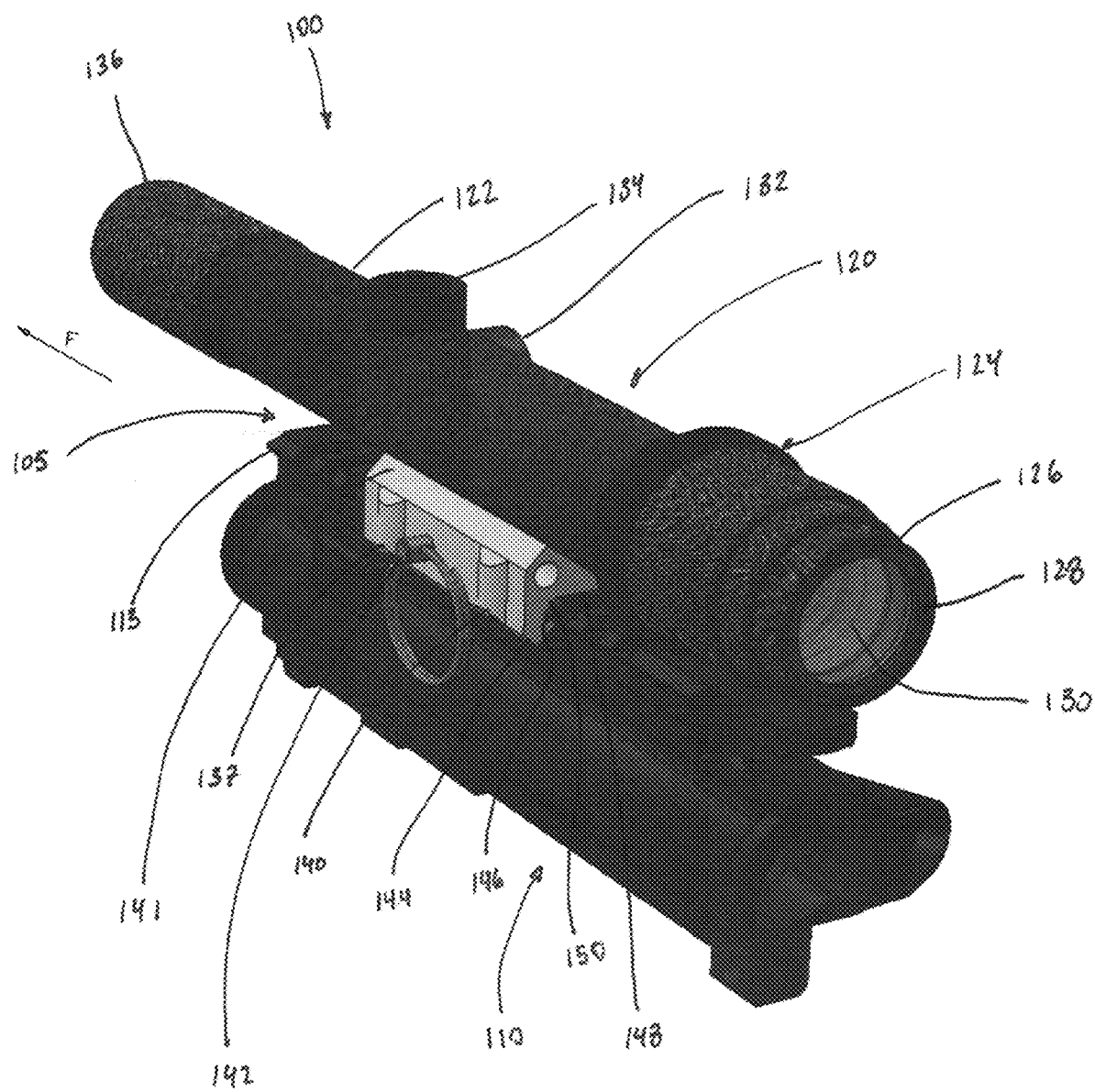
FIG. 1 is a rear perspective view depicting an example mounted scope and mounting assembly in accordance with one aspect of the present disclosure.

In connection with the views and examples of FIGS. 1-9, wherein like numbers indicate the same or corresponding elements throughout the views, FIGS. 1-7 show views of an example scope assembly 100 with integrated mount 141 and a mounting point 110 for the scope assembly 100, in accordance with aspects of the present disclosure. The scope assembly 100 may include a main scope body 122 having an inner (FIG. 8) 121 and an outer surface 120. The main scope body 122 is shown in FIG. 1 as having a generally tubular outer shape; however, the scope body is not limited as such shape.

The main scope body 122 may comprise a composite and/or a composite substrate. A composite for use with this example implementation is not limited to, and may include any one or combination of: carbon fiber, carbon fiber reinforced plastic, poly-para-phenylene terephthalamide, glass-reinforced plastic, and/or glass-fiber reinforced plastic. The body 122 may further include an epoxy, polyester, vinyl ester, and/or nylon. The main scope body 122 may be formed as a molded fiber reinforced plastic, layered and/or laminated substrate or a molded thermoplastic matrix, for example. Further, the inner surface of the main scope body may include a threaded and/or machined insert 128 proximal to the inner surface of the scope body, for example, for mounting of components inside the scope body. The insert 128 may comprise: aluminum, titanium, steel, brass, silicone bronze, and/or an alloy of the aforementioned materials, for example. The insert 128 and inner scope body may include additional features and/or processing to improve the interface between materials. Non-limiting examples of additional features and/or processing may include anodization and/or the addition of a separator between the outer scope body and the insert 128 (such as a fiberglass scrim), which may be added to prevent corrosion or galling between the insert and the outer scope housing. The insert 128, alternatively may comprise polyether ether ketone, reinforced polyether ether ketone, polyetherimide, reinforced polyetherimide, and/or reinforced nylon, for example.

The scope assembly 100 may further include an objective bell 136 and an eyepiece 126. The abovementioned insert 128 may further may include at least one transparent rear optic or optic protection portion 130. The scope assembly may further include one or more adjustment turrets or knobs; such as an elevation adjustment turret 132 and/or a windage adjustment turret 134. The turrets 132, 134 may control the location of the reticle for elevation and/or windage, for example. The assembly may further include a combination turret (not shown) for control of reticle illumination and/or image focus. The abovementioned turrets may also or alternatively adjust the erector 244, 246 and/or 248 (FIG. 9) to adjust for windage and/or elevation.

Further, the abovementioned turrets 132, 134 may have one or more detents for providing tactile feedback when a user turns the turret. The turrets 132, 134 are not limited to knobs as shown, and may provide a similar function in the form of a slider, button, or rocker switch, for example. The scope assembly 100 may further include a magnification ring 124 for varying the magnification of the scope.

The scope assembly 100 may further include a mounting portion 148 integrally mounted to the main scope body 122. The mounting portion 148 may be integrally molded as a part of the scope assembly 100 or may, for example, be bonded or otherwise attached to the scope body 122 or another portion of the scope assembly 100. The mounting portion may be formed of a composite that is the same as that of much of the remainder of the scope assembly 100, or may be formed of a different material from the scope assembly. Since the mounting portion may be mounted to an aluminum rail (e.g., for use with a firearm), it may be preferable to use a material similar in electropotential or that is substantially non-conductive in order to prevent galvanic corrosion therebetween. Further it may be advantageous to form the mounting portion using a lightweight material that has a low coefficient of expansion, for example. It may be preferable to form the mounting portion of a material having a coefficient of linear thermal expansion less than $55 \times 10^{-6}$ m/mK (+/−10%) between 23° C. and 150° C. The mounting portion may comprise at least one of a carbon fiber, carbon fiber reinforced plastic, poly-para-phenylene terephthalamide, glass-reinforced plastic, glass-fiber reinforced plastic, polyether ether ketone, reinforced polyether ether ketone, polyetherimide, reinforced polyetherimide, and/or reinforced nylon, for example. The composite may further include; epoxy, polyester, vinyl ester, nylon. The use of polyether ether ketone, reinforced polyether ether ketone, polyetherimide, reinforced polyetherimide, and/or reinforced nylon may prevent corrosion between the mounting portion 148 and the metallic mounting portion of the firearm, for example. The mounting portion 148 may further be either molded as a fiber reinforced plastic and/or be comprised of a layered or laminated substrate. Forming the mounting portion 148 of polyether ether ketone, reinforced polyether ether ketone, polyetherimide, reinforced polyetherimide, and/or reinforced nylon, may further prevent corrosion between the mounting portion 148 if the mounting rail 105 is formed of an aluminum or similar metallic material, for example.

Figure 6:
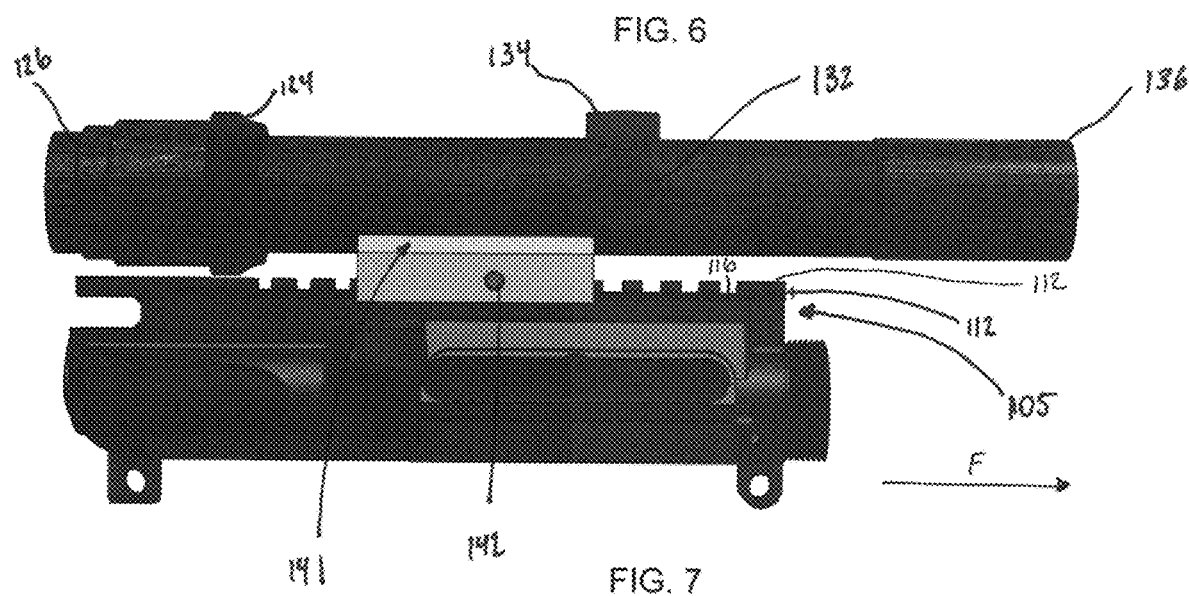
FIG. 6 is a side view depicting an example mounted scope and mounting assembly in accordance with one aspect of the present disclosure.
Figure 7:
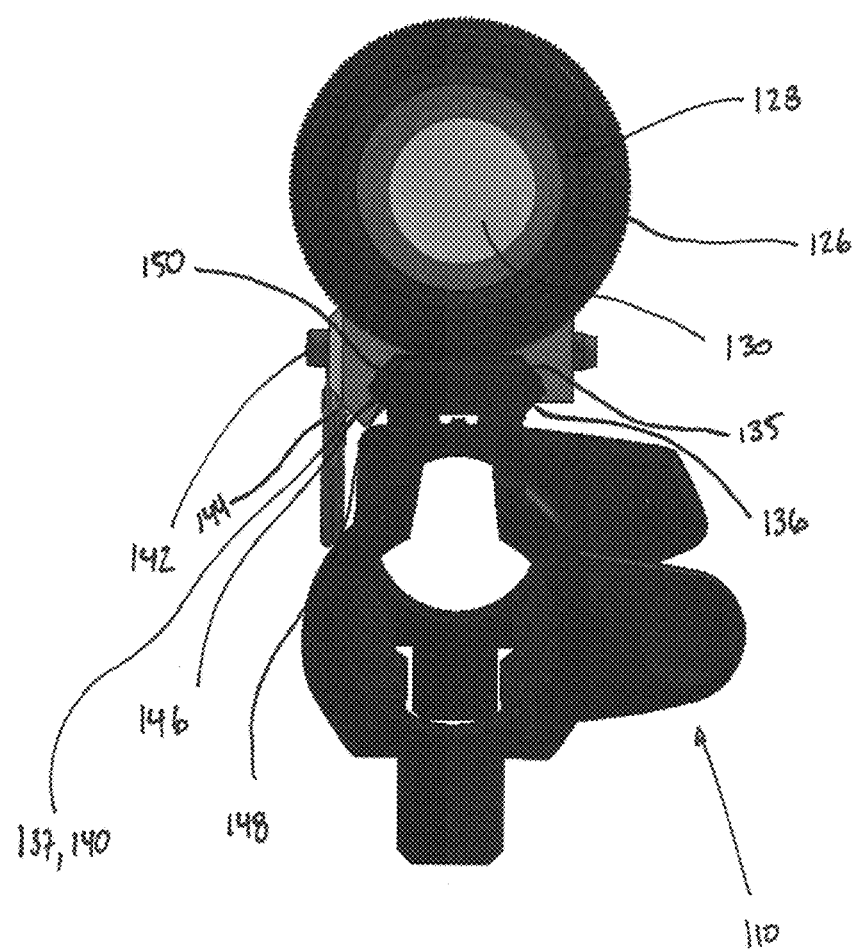
FIG. 7 is a rear view depicting an example mounted scope and mounting assembly in accordance with one aspect of the present disclosure.
Figure 8A:
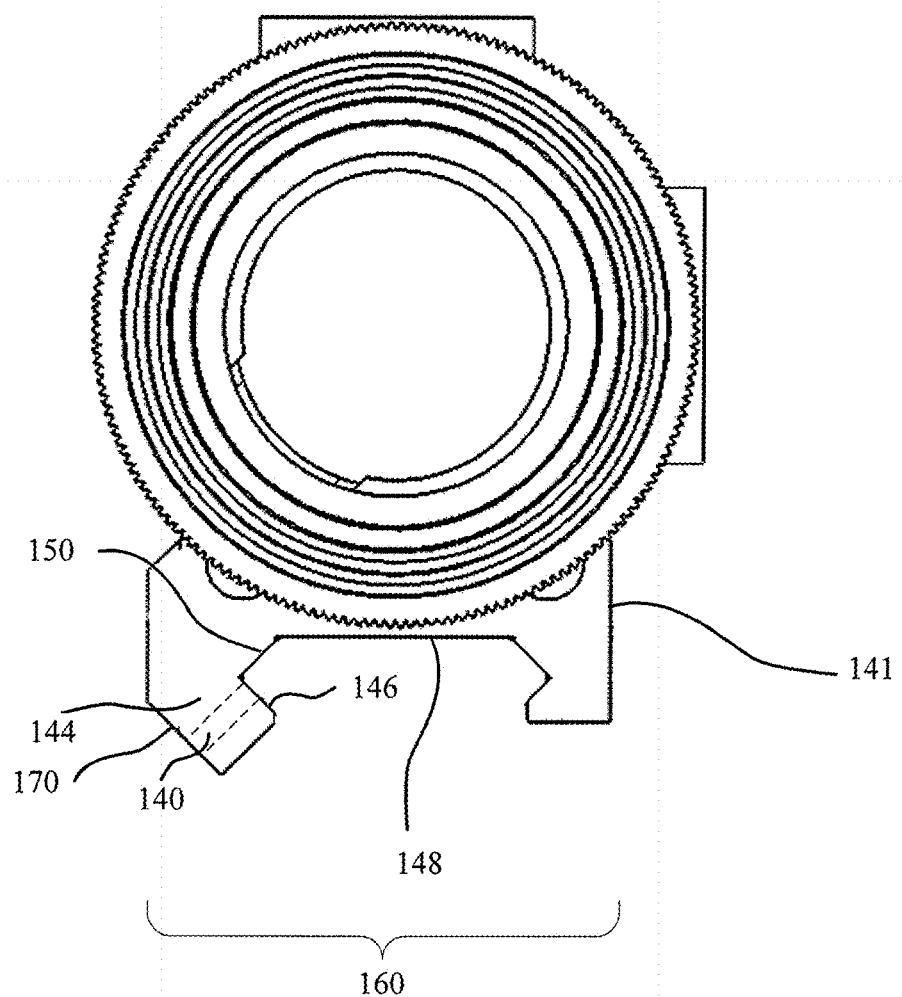
FIG. 8A is a rear view depicting an example unmounted scope and integrated mount in accordance with one aspect of the present disclosure.
Figure 8B:
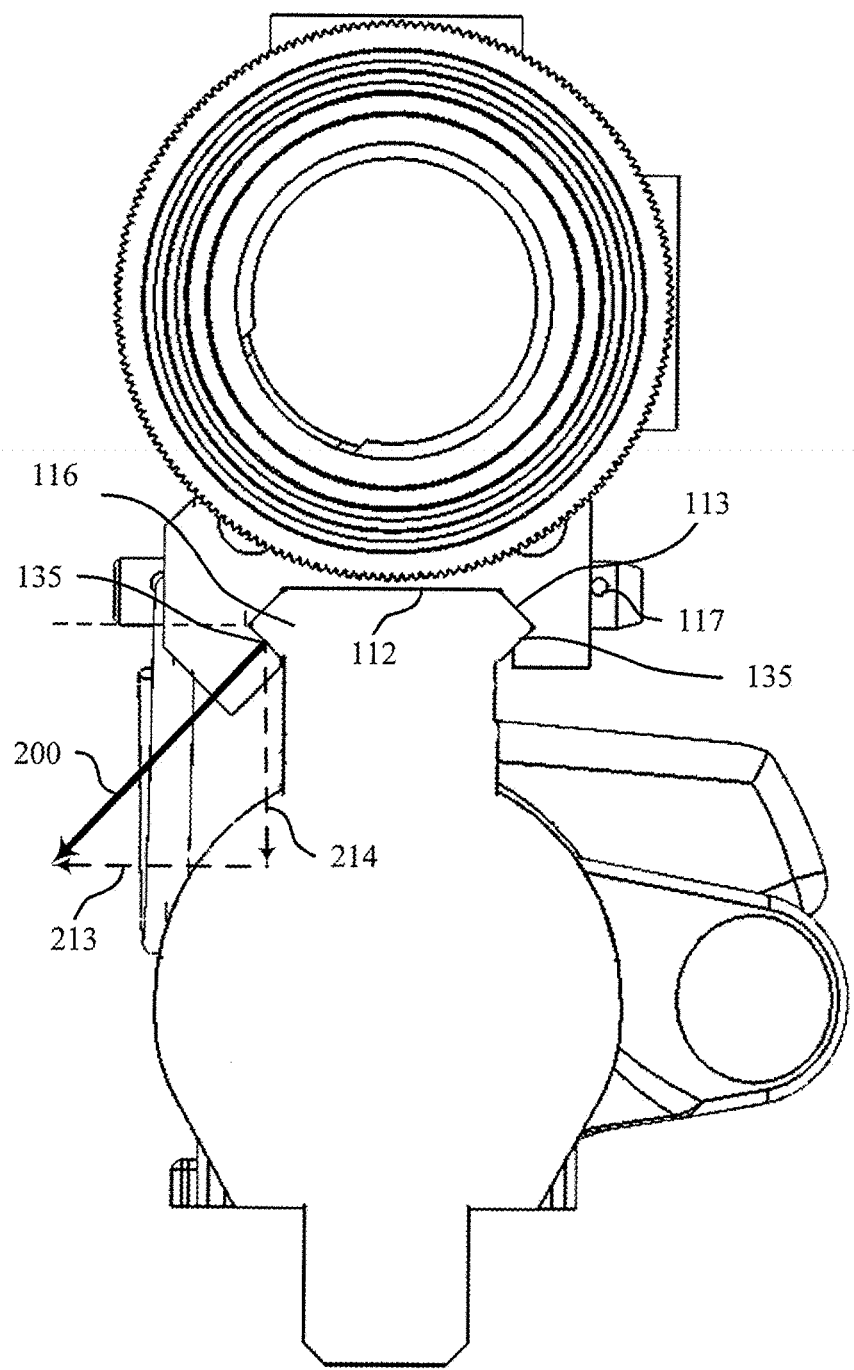
FIG. 8B is a rear view depicting an example mounted scope and mounting assembly in accordance with one aspect of the present disclosure.

The mounting rail 105, to which an integrated mount 141 may be mounted, may include a scope attachment portion 112 as shown in FIGS. 6 and 8B which, for explanation and orientation purposes, may extend in a direction F. The scope attachment portion 112, may include a plurality of recoil grooves 116 formed such that each groove extends in a direction generally perpendicular to the direction F. The mounting rail 105 may further include an angled portion 113 having an angled surface relative to a plane extending along an edge of the scope attachment portion 112 in the direction F (e.g., the upper edge of scope attachment portion 112 as shown in FIG. 8). The angled portion 113 may be on both sides of the rail and angled in relation to an axis perpendicular to the F direction. The mounting rail 105 may also include second angled portions 135 as shown in FIG. 8. The second angled portions 135 may intersect with the angled portions 113 forming a line along the intersection of the second angled portion 135 and the angled portion 113, the line extending substantially perpendicular to the direction F. The second angled portion 135 and may be on both sides of the rail in relation to an axis perpendicular to the direction F.

Figure 2:
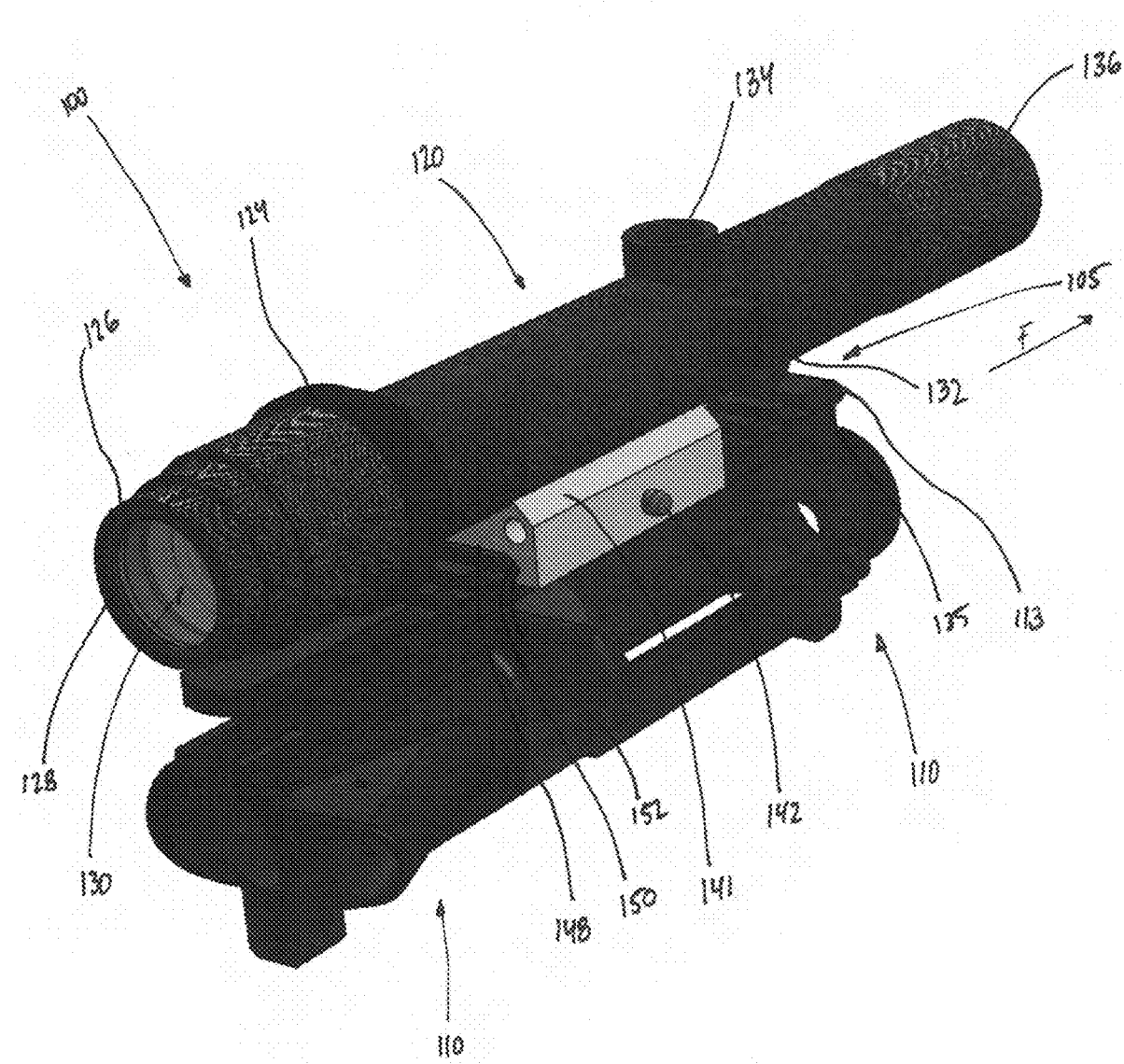
FIG. 2 is a rear perspective view depicting an example mounted scope and mounting assembly in accordance with one aspect of the present disclosure.
Figure 3:
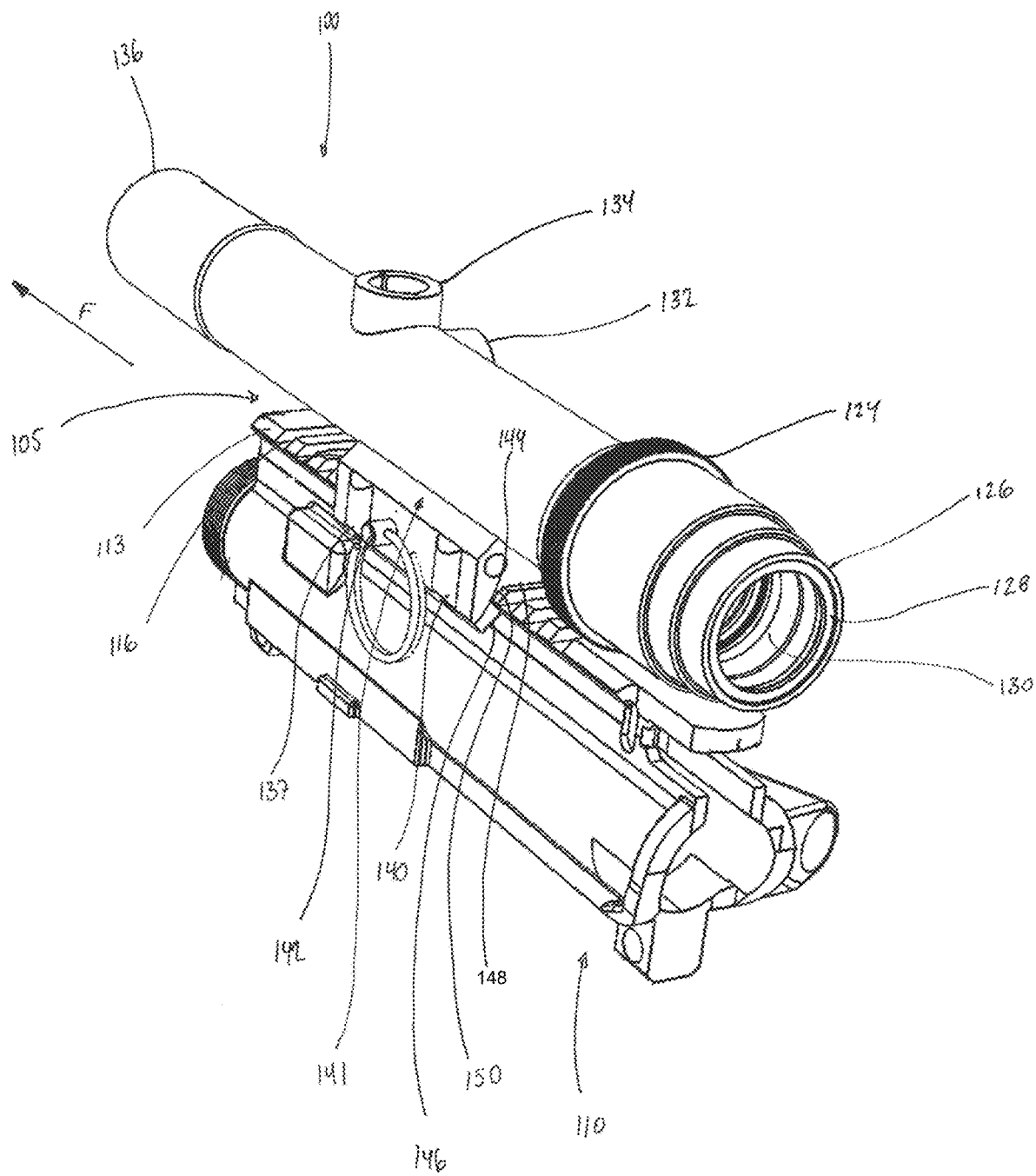
FIG. 3 is a rear perspective view depicting an example mounted scope and mounting assembly in accordance with one aspect of the present disclosure.
Figure 4:
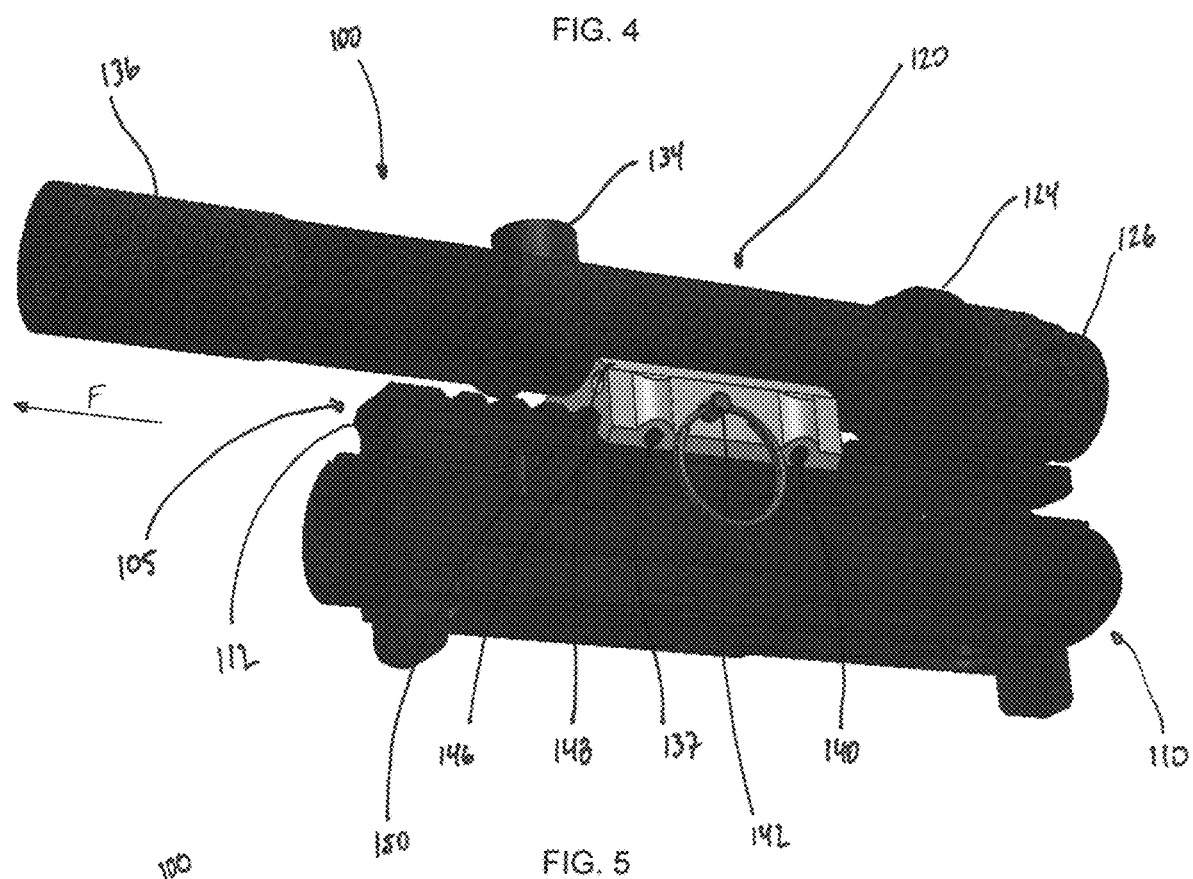
FIG. 4 is a front perspective view depicting an example mounted scope and mounting assembly in accordance with one aspect of the present disclosure.
Figure 5:
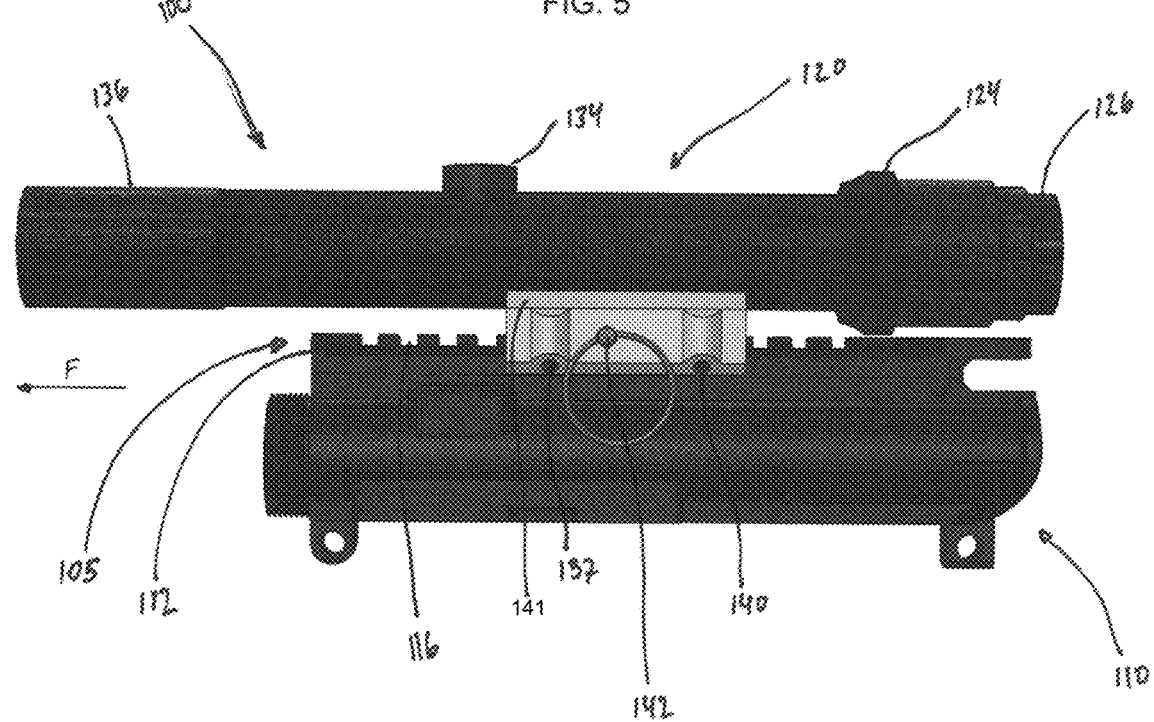
FIG. 5 is a side view depicting an example mounted scope and mounting assembly in accordance with one aspect of the present disclosure.

Referring to FIGS. 8A and 8B, the integrated mount 141 may include a receiving portion 160 for receiving the mounting rail 105. The receiving portion 160 may include a mounted flat portion 148 which may extend in direction F as shown in FIG. 6 when aligned with the mounting rail 105. The receiving portion 160 may further include a first angled portion 150. The mounted flat portion 148 may intersect with the first angled portion 150 as shown in FIG. 8A forming edge extending in a direction parallel to direction F when the scope is oriented as shown in FIG. 2. The first angled portion 150 may further be located on both sides of the flat portion 148 and angled in relation to an axis perpendicular to direction F when the flat portion is aligned with the mounting rail 105 and when the scope and firearm body are oriented as shown in FIG. 2. The receiving portion 160 may further include a clamp mount 144. The clamp mount 144 may include an inner clamp wall 146 that may intersect and may be angled with relation to the first angled portion 150. The clamp mount 144 may further include a single or a plurality of clamping points 137 (FIG. 5) and 140 (FIGS. 5 and 8A). The clamp points 137, 140 may include, but are not limited to, a threaded through hole extending from an outer surface 170 of the integrated mount 141 to the inner clamp wall 146. Wherein the clamp point may be configured to receive a corresponding threaded clamp (not shown), that may be a bolt for example. The clamp may thread through the threaded through hole and contact the mounting rail 105 at a second angled portion 135. The clamp may 144 further include a retainer portion to prevent the accidental removal of the clamp from the threaded portion 140; as an example, the retainer portion may comprise a stopper on the end of a bolt, a washer or some other method of preventing the example bolt from backing all the way out of the threaded through hole 140. Other clamping methods may be employed such as a cam or cam mechanism for tightening the receiving portion 160 to the mounting rail 105. As shown in FIG. 8B, the clamp mount 144 may allow for a force in a direction 200, having components in directions 213 and 214; force 214 causing the integrated mount to self-center on the mounting rail 105. Self-centering may occur through the abovementioned force 214 and the interaction between the angled portions 113 of the mounting rail 105 and the first angled portions 150 of the integrated mount 141.

The integrated mount may further include a recoil stop 142, which passes through a through hole on both ends of the integrated mount 141, A shown in FIG. 8A, the recoil-stop may extend between a recoil groove 116 and interoperate with and may contact a recoil groove 116 of the mounting rail 105. The recoil stop 142 may comprise, but is not limited to, a pin or a bolt. The recoil stop 142 may further include a retainer portion 117, or preventing the recoil stop 142 from being removed once the stop is installed; the retainer portion 117 may comprise a pin extending through a hole at portion 117 on the end of the recoil stop, for example.

Figure 9:
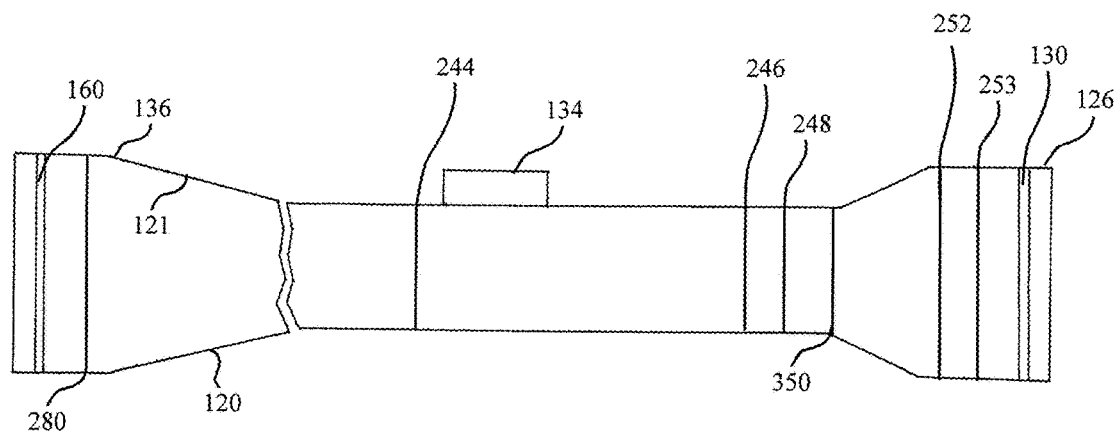
FIG. 9 is a simplified cross section view depicting one example of a scope in accordance with one aspect of the present disclosure.
Figure 10:
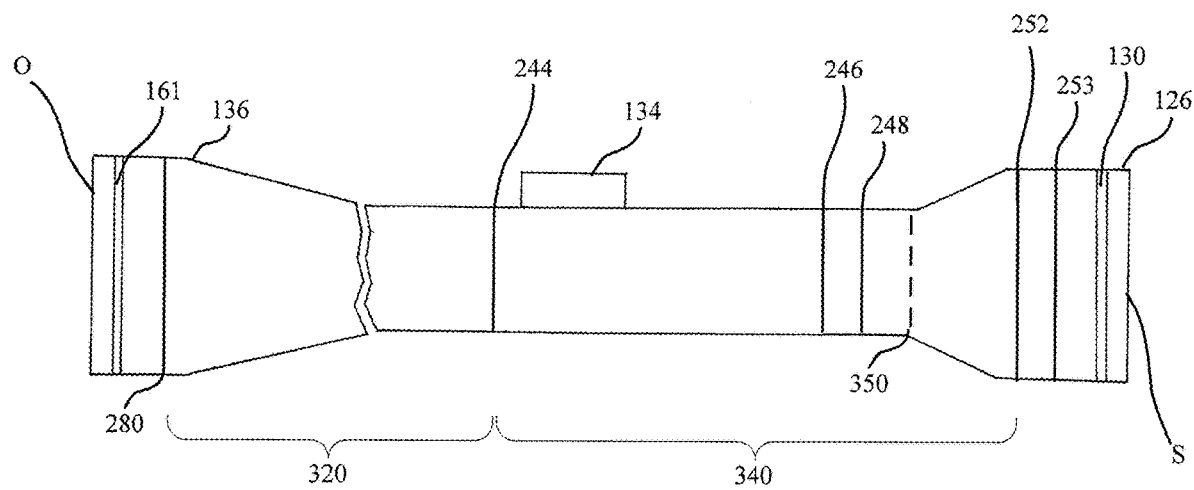
FIG. 10 is a simplified cross section view depicting one example of a scope in accordance with one aspect of the present disclosure.
Figure 11A:
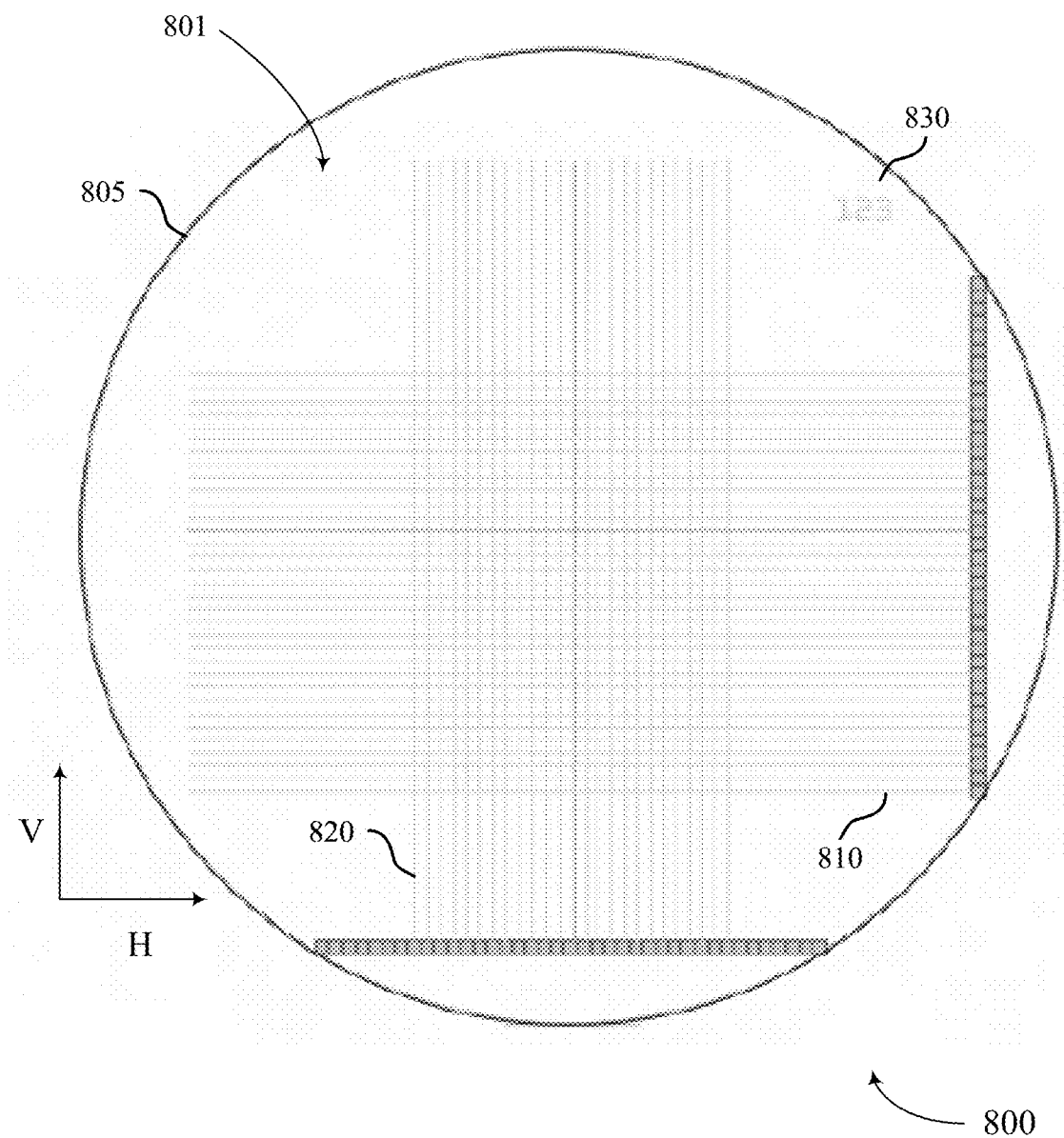
FIG. 11A is a view of an example reticle display in accordance with one aspect of the present disclosure.
Figure 11B:
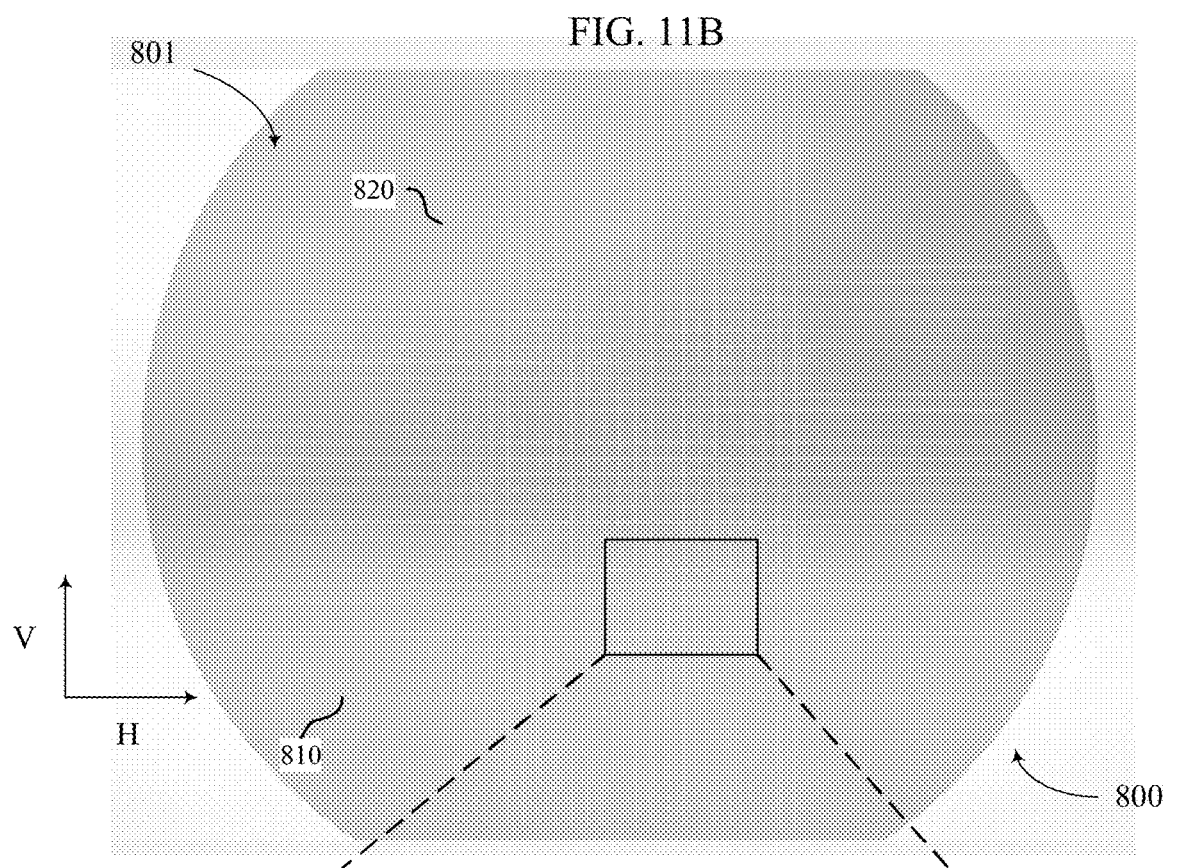
FIG. 11B is a view of an example reticle display having reference dots in accordance with one aspect of the disclosure.
Figure 11C:
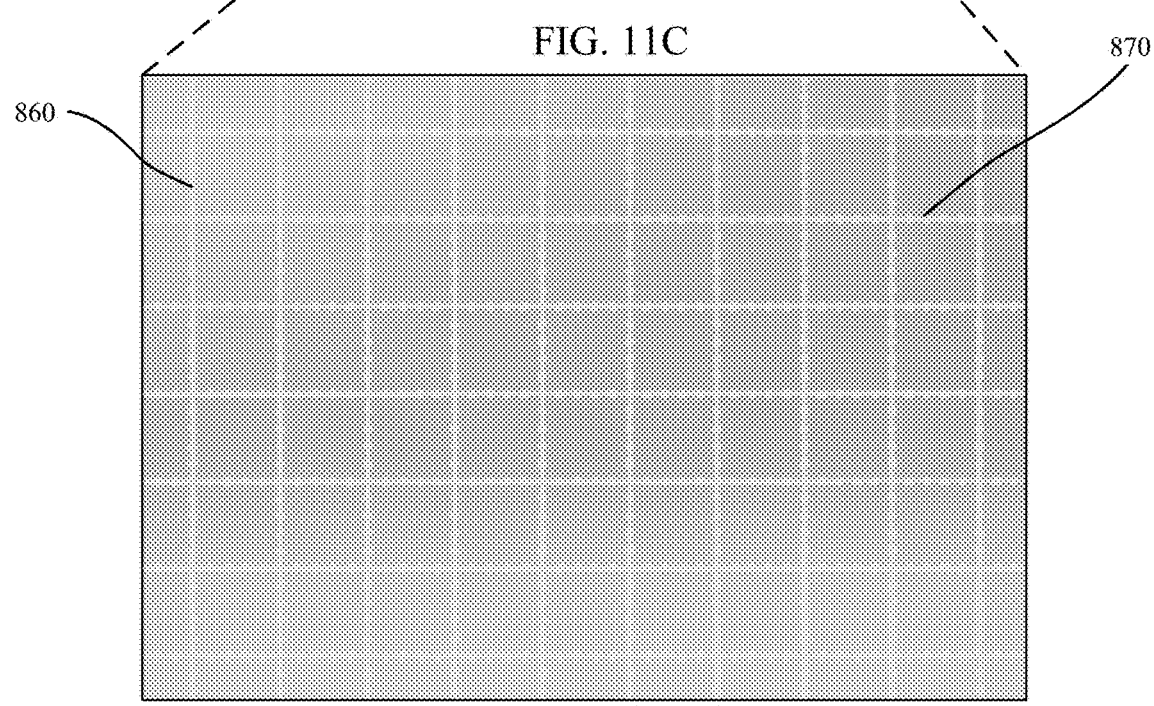
FIG. 11C is a magnified view of the reticle display in FIG. 11B in accordance with one aspect of the disclosure.

The scope body 122 may optionally house an electroluminescent electronically adjustable reticle 800. As shown in FIG. 11, the electroluminescent adjustable reticle may comprise, for example, an optically transparent substrate 805, having a substantially transparent optical array 801. The substrate may be formed according to the method described at the website: http://lumineq.com/en/products/tfel; as viewed on Jul. 14, 2016, the contents of which are hereby incorporated by reference in its entirety. Referring now to FIGS. 9 and 10, the scope may include a first end O and a second end S. The substrate 805 may be located in a focal plane, such as at a point between the objective lenses and ocular lens or lenses for example, in a location 350 between an erector 248 and an ocular lens or lenses 252 and 253 An erector lens assembly 244, 246 and/or 248 may be located between the objective lens or lenses 280 or ocular lenses 252 and/or 253, and the transparent substrate 805 may be located between the objective lens and the erector in region 320 and/or between the erector and ocular lens in region 340 depending on if a magnification of the reticle is desired. The optically transparent substrate 805 may further be incorporated into any of the optics within the sight, some non-limiting examples being the objective lens 280, ocular lens or lenses 152 and/or 252, and/or erectors 244, 246 and 248, or the substrate 805 may be integrated into the transparent optics protection portions 130 and/or 161 at either end of the scope.

Electroluminescent displays are generally comprised of a substrate having a layer of electroluminescent material between to conductive layers. When current is applied across the conductive layers of the substrate the electroluminescent material emits visible light. In one aspect, the electroluminescent display may comprise a glass or transparent substrate having thin film on the glass or substrate. The thin film may include a layer of light emitting electroluminescent material formed thereon or attached thereto, such light emitting electroluminescent material may comprise, for example, a phosphor; manganese, silver, or copper-doped zinc sulfide. The electroluminescent layer may be located or formed between two dielectric layers that comprise the electroluminescent display. Electric current passed through or a magnetic field imposed upon the display may cause the abovementioned electroluminescent layer to give off protons and thereby emit visible light, for example. The abovementioned conductive layers may be a transparent electrode formed of a Tin Oxide or other conductive materials, as described further below, or may be provided through metal nanofibers for example. The display may be formed according to the processes, or used in conjunction with various features, described in U.S. Pat. Nos. 9,226,362 B2 and 9,290,840 B2, which are attached and hereby incorporated by reference.

Figure 12A:
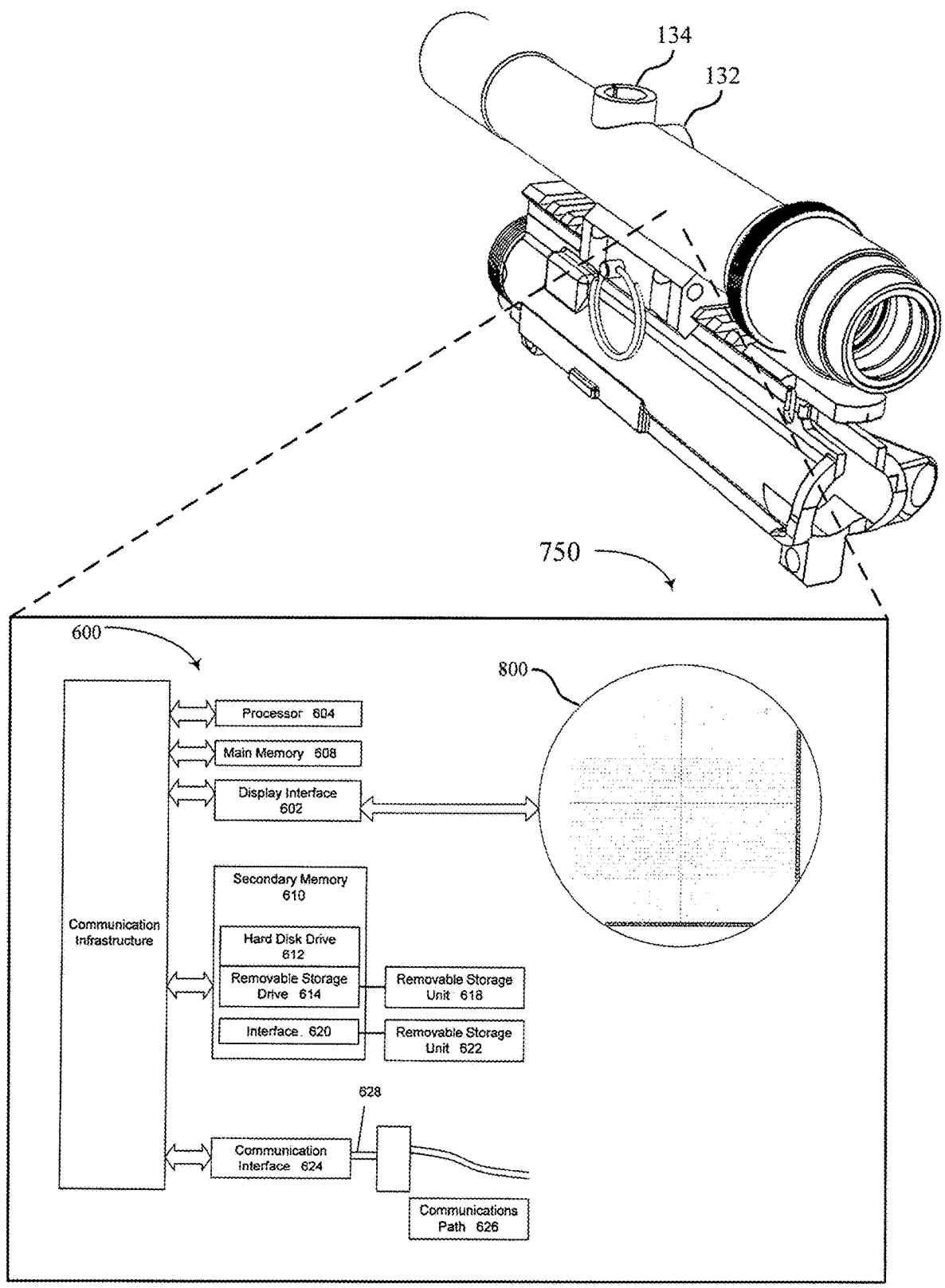
FIG. 12A is a view depicting a first example controller in accordance with aspects of the present disclosure.
Figure 13:
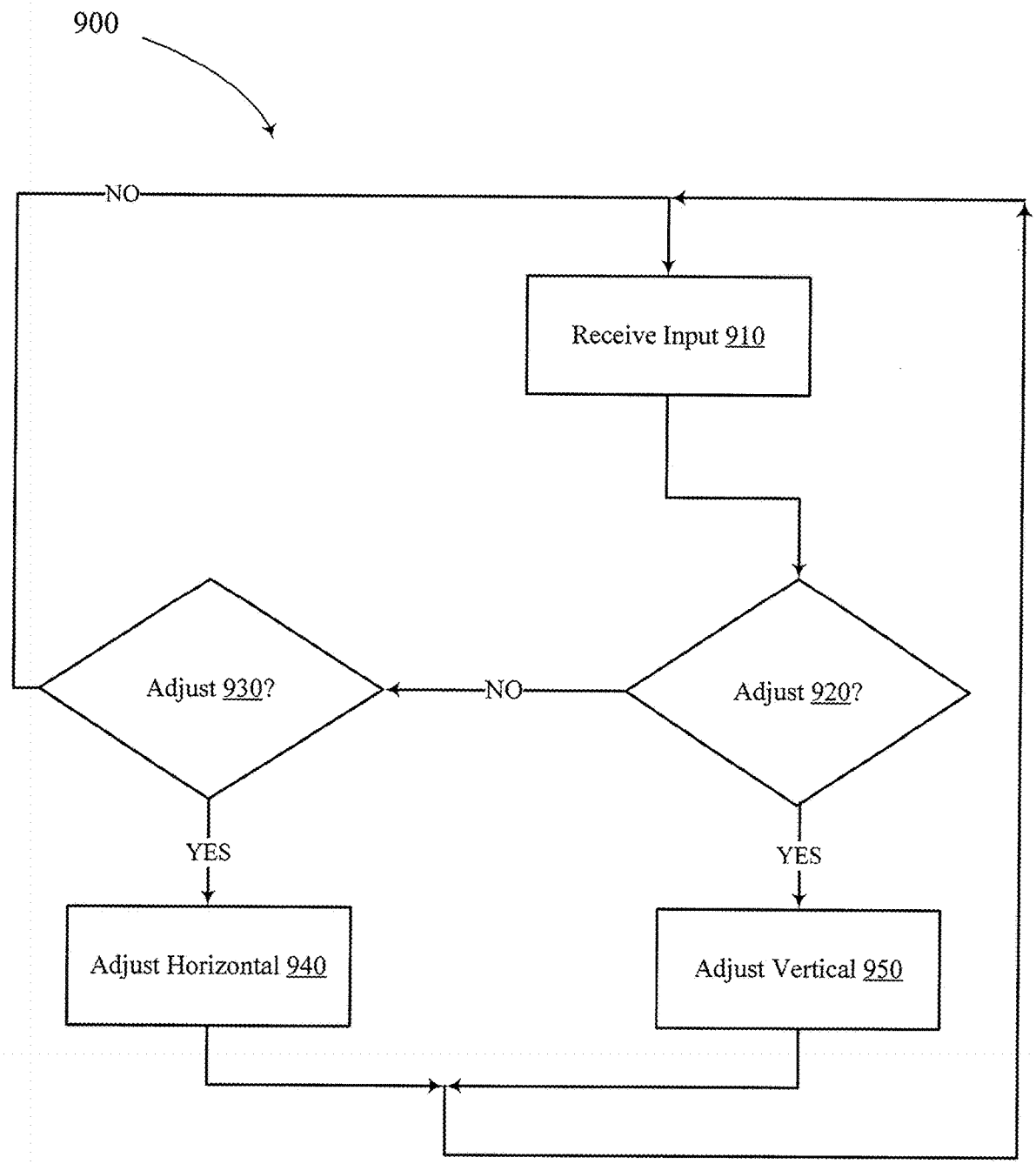
FIG. 13 is a flow chart depicting one control method of the reticle display in accordance with one aspect of the present disclosure.
Figure 14:
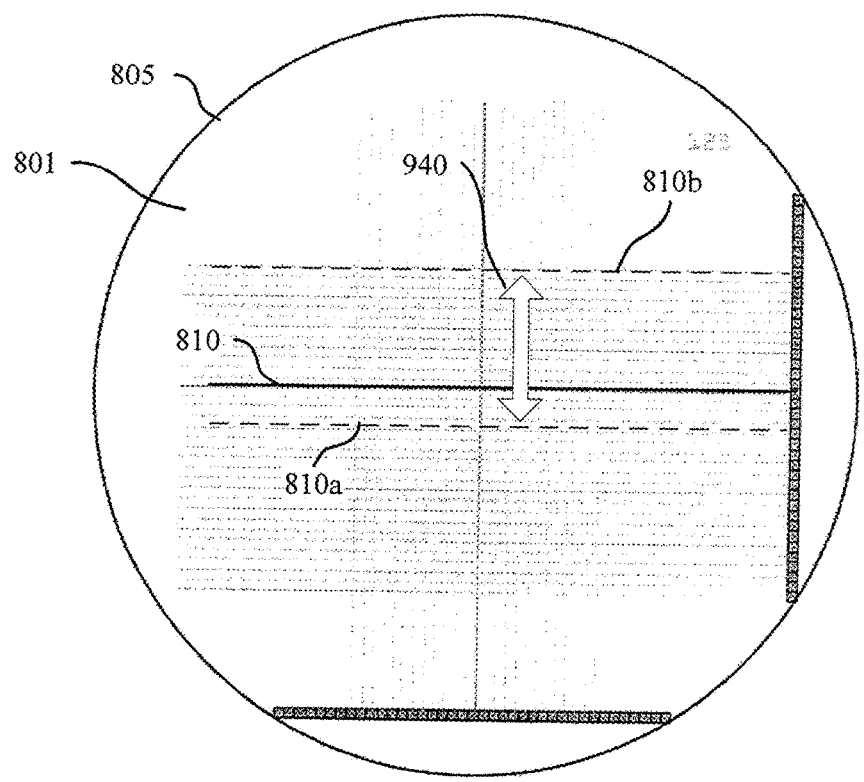
FIG. 14 is a view of an example reticle display in accordance with one aspect of the present disclosure.
Figure 15:
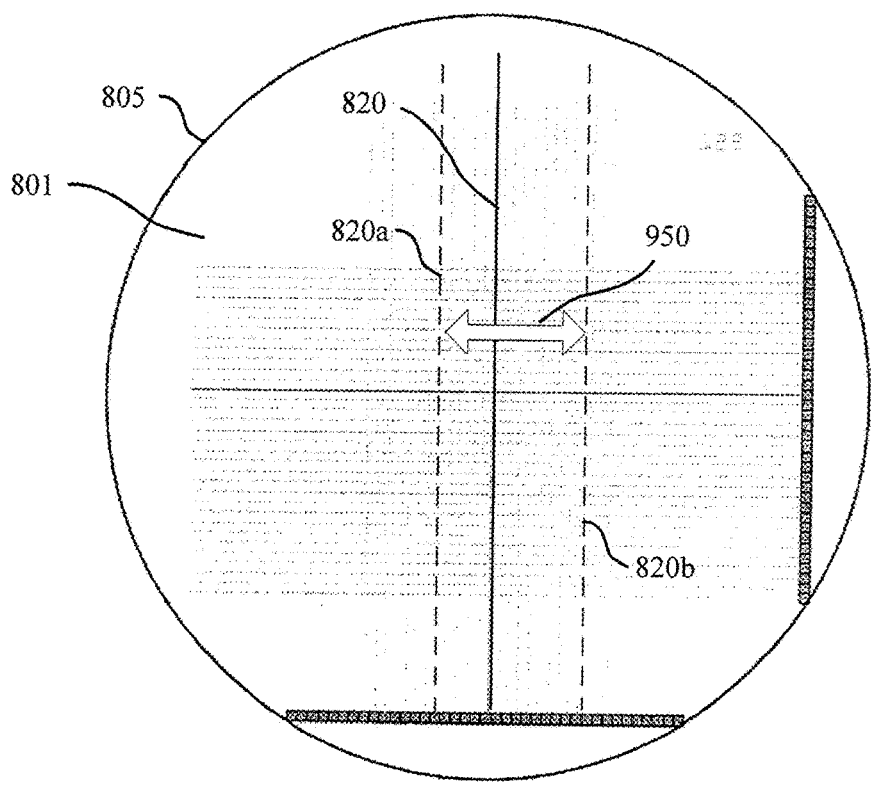
FIG. 15 is a view of an example reticle display in accordance with one aspect of the present disclosure.

Referring now to FIGS. 11, 14 and 15 The optical array 801 may include a plurality of lines 820 extending in a first direction V (e.g., extending vertically when viewing the array 801 when positioned on a firearm in a firing position) that remain substantially transparent when not in use but one or more of which may become lit or otherwise highlighted 950 (FIG. 15) when electric current or magnetic field is applied. The optical array 801 may further include a plurality of second lines 810 extending in a second direction H (e.g., extending horizontally when viewing the array 801 when positioned on a firearm in a firing position that remain transparent when not in use but one or more of which may become lit or highlighted 810 (FIG. 14) when electric current or a magnetic field is applied. A controller 700, 750 (FIGS. 12A, 12B), for example, may selectively apply current or voltage, for example, to each of the horizontal or vertical lines 810, 820 to be lit or highlighted through a display interface 716 (FIG. 12A). For example, the controller 700, 750 (see, e.g., FIGS. 12A, 12B, described further below) may selectively provide current or voltage to each display segment to be lit or highlighted based on a user operating the abovementioned turrets 132 and 134 (e.g., FIG. 1). As shown in the process 900 of FIG. 13, the controller may receive an input signal 910 from turrets 132 and 134 (FIG. 1), and based on the input signal received make a first determination 920 to adjust the location of the current or voltage to be applied to a particular segment 820 (FIG. 15) in a horizontal direction 950 (FIG. 15). For example, as shown in FIG. 15, the current or voltage may be initially applied as a default to a vertically extending segment in a first position 820, and move to a second position 820a or a third position 820b in response to windage adjustment received from the windage turret 134 (FIG. 1). Further the controller may receive an input signal 910 from the abovementioned turrets 132 and 134 (e.g., the elevation turret 132 of FIG. 1), and based on the received signal make a second determination 930 to adjust the location of the current or voltage applied to from an initial default segment 810 (FIG. 14) in a vertical direction 940 (FIG. 14). For example, as shown in FIG. 14, the current or voltage may be applied so as to change the lit or highlighted segment from a first position 810 to a second position 810a or a third position 810b. The controller 700, 750 (FIG. 12A or 12B) may adjust the abovementioned location of the currents based on a manual input from the user (e.g., the abovementioned turrets 132 and/or 134) or automatically based on inputs regarding any one of a windage, elevation, and/or distance determination, for example. Further, the controller 700, 750 (FIG. 12A or 12B) may provide an auto-off feature for turning off illumination of any sections of the optical array when the scope is stationary for a set period of time. The controller 700, 750 (FIG. 12A or 12B) may further feature an auto-on/off feature based on the detection of movement of the scope or detection of a user placing the eyepiece 126 (FIG. 1) in proximity to the user's eye, for example. Such detection may be made, for example, using an inertial or other motion sensor for movement, or an infrared or other proximity detector for determining proximity to a user's eye as described in U.S. Pat. No. 5,699,115 which is attached and hereby incorporated by reference, for example.

The optical array 801 may optionally further include any number of informative displays 830 for displaying characters, for example, as shown in FIG. 11. The informative display may display, but is not limited to numerals relating to a yardage or other distance, round count, or elevation measurement. The informative display 830 may be formed using the methods described above (and devices described below) and/or via use of a similar thin film substrate as is used for the abovementioned line portions. The informative display 830 may further include a plurality of the abovementioned informative displays. The illumination of the informative display may be controlled by the abovementioned controller 700, 750 (see FIGS. 12A and 12B and further accompanying description below), or via a separate controller or other device.

In another aspect, the adjustable reticle may comprise, for example, a series of reference dots on each of the abovementioned segments to allow a user to view a frame of reference with or without adjusting the reticle. For example, as shown in FIGS. 10A-C, a series of first reference dots 860 may be part of and/or added and arranged in the first direction V along at least one of the plurality of lines 820 (e.g., extending vertically when viewing the array 801 when positioned on a firearm in a firing position). The reticle may further include a series of second reference dots 870 which may be spaced at intervals along at least one of the plurality of second lines 810 in a second direction H (e.g., extending horizontally when viewing the array 801 when positioned on a firearm in a firing position). The reference dots 860 and/or 870 and may remain substantially transparent when not in use, but one or more of which may become lit or otherwise highlighted when the line segment along which the reference dots are arranged is lit. Further, the reference dots may be capable of being individually lit either with or separate from the line segment along which the reference dots are arranged. In one aspect each individual reference dot may be lit individually or by selected groups based on input from the controller 700.

As shown in FIGS. 10B and 10C, the reference dots may be evenly spaced, for example, such that there are one or a plurality (e.g., four) dots on a segment in the first direction V between two respective segments in the second direction H and vice versa. The MIL-Dots may be spaced, for example, so as to allow for range estimation and/or to compensate for bullet drop and/or windage adjustments. As an example, the reference dots may be MIL-Dots and the spacing between each MIL-Dot may represent a miliradian. As an example, the MIL-Dots may be spaced so that the spacing between the centers of two consecutive MIL-Dots represents 1 yard at a distance of 1000 yards. It is noted, that the reference dots may be located along any of the above segments and/or may be located at any separate location on the reticle. Further, in one example implementation, the reference dots may be etched into the surface of the reticle substrate or printed on the reticle surface so as to be visible at all times through the scope.

As shown in FIG. 12A, in one example implementation, the controller 700 may include a processor 712, a power supply 714, a display interface 716 for controlling a display, such as an electroluminescent electronically adjustable reticle 800, and a memory 740. Example features of each of these portions of the controller 700 of FIG. 12A is discussed in more detail with regard to FIG. 12B below.

Figure 12B:
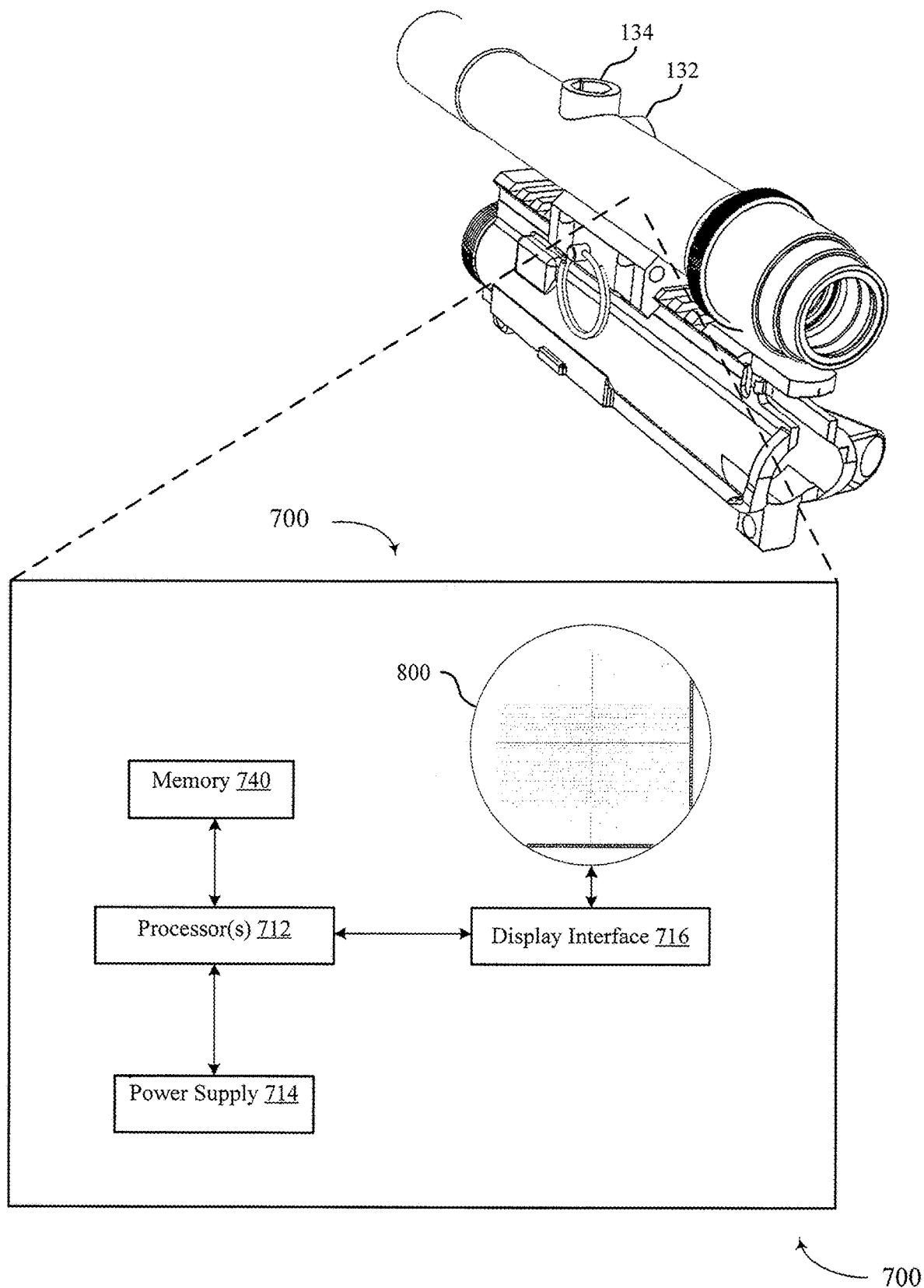
FIG. 12B is a view depicting a second example controller in accordance with aspects of the present disclosure.

As shown in FIG. 12B, the controller 750 may alternatively include or be coupled with a computer, or aspects thereof (e.g., via wired or wireless coupling, such as is shown in and described with respect to FIG. 16 below), for implementing the abovementioned steps using hardware, software or a combination thereof. In one aspect of the present disclosure, features are directed toward one or more computer systems capable of carrying out the functionality described herein.

Computer system 600 includes one or more processors, such as processor 604. The processor 604 may be connected to a communication infrastructure 606 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 600 can include a display interface 602 that translates data from the communication infrastructure 606 (or from a frame buffer not shown) for display on the reticle 800. Computer system 600 also includes a main memory 608, which may be a random access memory (RAM), and may also include a secondary memory 610. The secondary memory 610 may include, for example, a hard disk drive 612 and/or a removable storage drive 614, representing a universal serial bus (USB) flash drive, etc. The removable storage drive 614 reads from and/or writes to a removable storage unit 618 in a well-known manner. Removable storage unit 618 may include a USB flash drive, for example, which is read by and written to removable storage drive 614. As will be appreciated, the removable storage unit 618 includes a computer usable storage medium having stored therein computer software and/or data.

Alternative aspects of the abovementioned computer may include secondary memory 610 and may include other similar devices for allowing computer programs or other instructions to be loaded into computer system 600. Such devices may include, for example, a removable storage unit 622 and an interface 620. Examples of such may include a program cartridge and cartridge interface, a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

The computer 600 in controller 700 may also include a communications interface 624. Communications interface 624 allows software and data to be transferred between computer system 600 and external devices. Examples of communications interface 624 may include a Bluetooth® module, a network interface, a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive, a hard disk installed in hard disk drive, and signals 628. These computer program products provide software to the computer system 600. The disclosure is directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features in accordance with aspects of the present disclosure, as discussed herein. In particular, the computer programs, when executed, enable the processor 604 to perform the features in accordance with aspects of the present disclosure. Accordingly, such computer programs represent controllers of the computer system 600.

In an aspect of the present disclosure where the steps are implemented using software, the software may be stored in a computer program product and loaded into computer system 600 using removable storage drive 614, hard drive 612, or communications interface 620. The control logic (software), when executed by the processor 604, causes the processor 604 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s). In another aspect of the present disclosure, the disclosed controller functions may be implemented using a combination of both hardware and software.

The substrate 805 of reticle 800 may further be used in combination with a wire reticle, a cross-hair, and/or a reticle etched into the substrate that is/are provided as a stationary frame of reference in case of an electroluminescent display failure or misalignment.

Figure 16:
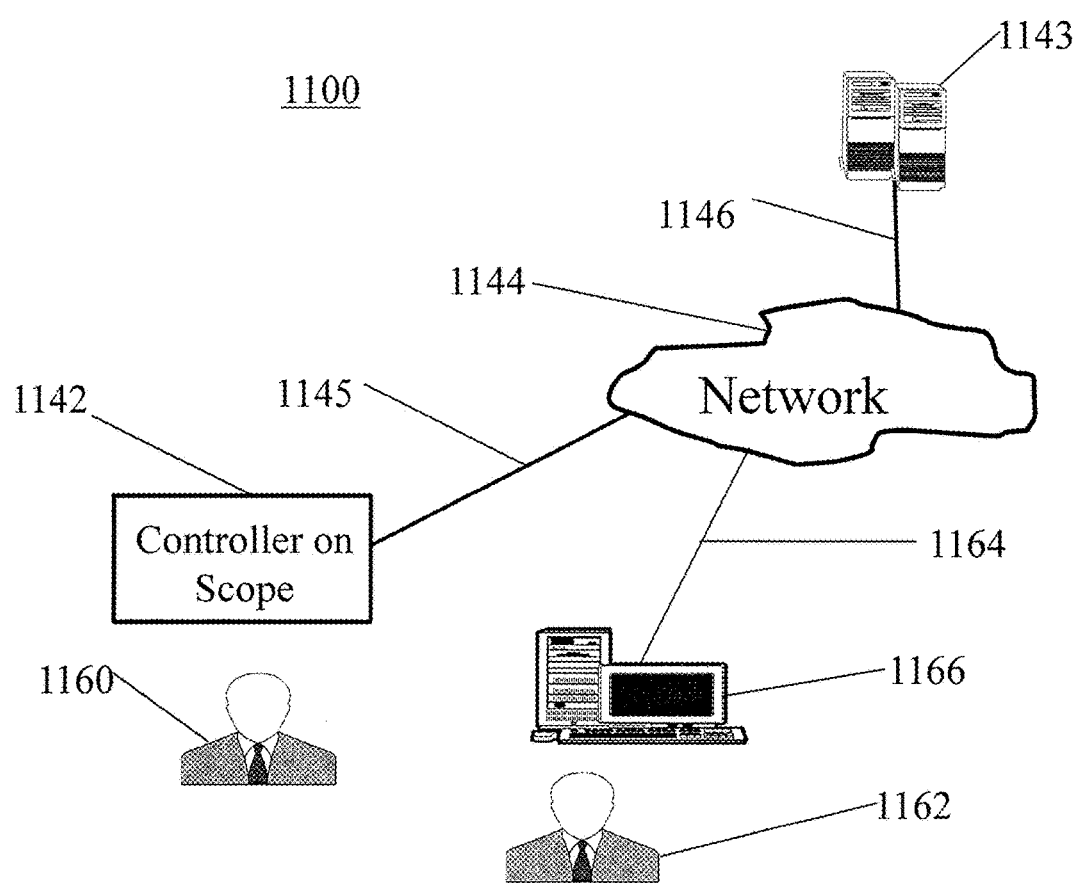
FIG. 16 contains a representative diagram of an example computer system capable of carrying out functionality described in example implementations via a coupled device, such as a device on a network, in accordance with aspects of the present invention.

FIG. 16 shows an example components within a system 1100 usable in accordance with the present invention. The system 1100 includes one or more users 1160, 1162, one or more controller components within a scope 1142 and one or more terminals 1166. In one aspect, data input for use, and various features for processing and display, for example, in accordance with aspects of the present invention may be, for example, input and/or accessed by the one or more controller components within the scope 1142, which may further be processed or otherwise communicate with one or more terminals 1166, such as personal computers (PCs), mini-computers, mainframe computers, microcomputers, telephonic devices, or wireless devices, such as personal digital assistants ("PDAs"), smart phones, or other hand-held wireless devices, which may optionally be coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiberoptic links.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

KEY FOR FIGURES

Number Part Name
100 Scope assembly
105 Mounting rail
110 Mounting point
112 Scope attachment portion
113 Angled portion
116 Recoil groove
117 Retainer portion
120 Outer surface
122 Scope body
124 Magnification ring
126 Eyepiece
128 Insert
130 Optic protection portion
132 Windage adjustment turret
134 Elevation adjustment turret
135 Second angled portion
136 Objective bell
137 Clamp point
140 Clamp point
141 Integrated mount
142 Recoil stop
144 Clamp mount
146 Inner clamp wall
148 Flat portion
150 First angled portion
152 Lenses
160 Receiving portion
161 Transparent optics protection portions
170 Outer surface
214 Centering force
244 Erector lens
246 Erector lens
248 Erector lens
252 Ocular lens
253 Ocular lens
280 Objective lens
600 Computer
602 Display interface
604 Processor
606 Communication infrastructure
608 Main memory
610 Secondary memory
612 hard disk drive
614 Removable storage drive
618 Removable storage unit
620 Communications interface
620 Interface
622 Removable storage units
624 Communications interface
626 Path
628 Signals
670 Hard disk drive
700 Controller
750 Controller
800 Electronically adjustable reticle
801 Optical array
805 Optically transparent substrate
810 Horizontal lines
820 Vertical lines
830 Informative display
860 First reference dots
870 Second reference dots
910 Input signal
920 First determination
930 Second determination
940 Vertical direction
950 Horizontal direction
1100 System
1142 Scope
1143 Server
1144 Network
1145 Couplings
1146 Couplings
1160 Users
1162 Users
1164 Couplings
1166 Terminals

What is claimed is:

1. An optical sighting apparatus, comprising:
a controller having a processor and a memory;
a body with a first end portion, a second end portion and having a central axis extending from the first end to the second end;
an objective lens disposed within the body, wherein the objective lens is located at a position, along the central axis, in a distance linearly closer from the first end portion than the second end portion;
an eyepiece lens disposed within the body at a position closer to the second end portion than the first end portion;
an erector lens disposed within the body at a position between the objective lens and the eyepiece lens; and
a substantially transparent reticle assembly disposed between the objective lens and the eyepiece lens, the reticle assembly including:
a substantially transparent substrate having an optical array, wherein the optical array includes:
a plurality of substantially transparent vertical line segments and a plurality of substantially transparent horizontal line segments, each of the plurality of vertical and horizontal line segments being formed of an electroluminescent material,
each of the plurality of vertical and horizontal line segments being configured to selectively emit non-reflected light in response to a current selectively applied thereto via the controller,
wherein in a first state a first pair of vertical and horizontal line segments are selectively illuminated so as to intersect at a first intersection location; and
wherein in a second state a second pair of vertical and horizontal line segments are illuminated so as to intersect at a second intersection location.

2. The optical sighting apparatus of claim 1, wherein the optical array includes an informative display portion formed of a plurality of said light emitting portions, the informative display portion displaying at least one of a yardage, round count, or elevation measurement based on an output from the controller.

3. The optical sighting apparatus of claim 1, wherein the reticle assembly substrate comprises two dielectric layers, and wherein each of the plurality of vertical and horizontal line segments is sandwichably are located between the two dielectric layers.

4. The optical sighting apparatus of claim 1, wherein the controller determines the pair of illuminated vertical and horizontal line segments to produce the intersection location based on input received by the controller.

5. The optical sighting apparatus of claim 4, wherein the input received by the controller at least partially includes an input signal received based on a user input.

6. The optical lighting sighting apparatus of claim 1, wherein the second state corresponds to an input for sighting adjustment.

7. The optical lighting sighting apparatus of claim 6, wherein the sighting adjustment adjusts for one selected from a group consisting of windage, elevation, and target distance.

8. The optical sighting apparatus of claim 1, wherein the selective illumination of one of the plurality of vertical line segments and one of the plurality of horizontal line segments such that the pair of illuminated vertical and horizontal line segments intersect at an intersection location obviates an necessitate for mechanical adjustment of the sighting apparatus.

9. A reticle assembly comprising:
a substantially transparent substrate having an optical array,
wherein the optical array includes:
a plurality of substantially transparent vertical line segments and a plurality of substantially transparent horizontal line segments,
wherein each of the plurality of vertical and horizontal line segments is formed of an electroluminescent material, and
wherein each of the plurality of vertical and horizontal line segments is configured to selectively emit non-reflected light in response to a current selectively applied thereto via the controller, so as to, in a first state, selectively illuminate a first pair of vertical and horizontal line segments so as to intersect at a first intersection location, and in a second state, illuminate a second pair of vertical and horizontal line segments so as to intersect at a second intersection location.

10. The reticle assembly of claim 9, wherein the optical array includes a series of substantially transparent horizontal and vertical transparent line segments formed of an electroluminescent material, each of the horizontal and vertical line segments being capable of selectively emitting light in response to a current selectively applied to each segment by the controller.

11. The reticle assembly of claim 9, wherein the transparent substrate includes two dielectric layers, and wherein each light emitting portion is located between at least two dielectric layers, wherein the substrate further includes at least one substantially transparent electrode.

12. An optical sighting apparatus, comprising:
a main body having a housing formed of a composite material, with a first end portion and a second end portion and having a central axis extending from the first end portion to the second end portion;
an objective lens disposed within the body, wherein the objective lens is located at a position less linear distance along the central axis from the first end portion than from the second end portion;
an eyepiece housing a lens, the eyepiece being disposed within the body at a position less linear distance along the central axis from the second end portion than from the first end portion;
an erector lens disposed within the body at a position between the objective lens and the eyepiece lens;
a substantial transparent reticle assembly disposed between the objective lens and the eyepiece lens, the reticle assembly including:
a substantially transparent substrate having an optical array, wherein the optical array includes a plurality of substantially transparent vertical line segments and a plurality of substantially transparent horizontal line segments, each of the plurality of vertical and horizontal line segments being formed of an electroluminescent material, each of the plurality of vertical and horizontal line segments being configured to selectively emit non-reflected light in response to a current selectively applied thereto, so as to, in a first state, selectively illuminate a first pair of vertical and horizontal line segments so as to intersect at a first intersection location, and in a second state, illuminate a second pair of vertical and horizontal line segments so as to intersect at a second intersection location; and
a mounting portion, formed of a composite material, the mounting portion comprising:
a rail receiver portion for receiving a mounting rail; and
a clamping portion for clamping the receiver portion to the mounting rail.

13. The optical sighting apparatus of claim 12, wherein the mounting rail is attached to a firearm.

14. The optical sighting apparatus of claim 12, wherein the mounting portion is integrally formed as a single body with the main body.

15. The optical sighting apparatus of claim 12, wherein the mounting portion is permanently bonded to the main body.

16. The optical sighting apparatus of claim 12, wherein the mounting portion is formed of a material having a coefficient of linear thermal expansion less than $55 \times 10^{-6}$ m/mK between 23° C. and 150° C.

17. The optical sighting apparatus of claim 12, wherein the mounting portion is formed of a material that is substantially non-conductive.

18. The optical sighting apparatus of claim 12, wherein the rail receiver portion further comprises:
at least one flat portion forming plane having a major axis perpendicular to said central axis;
a first angled portion located on each end of a minor axis of the flat portion, the first angled portion being capable of receiving a respective angled portion of a receiver portion; and
at least one second angled portion intersecting with at least one of the first angled portions;
wherein the clamping portion includes a first component and second component;
wherein the mounting rail has a central axis; and
wherein, when the rail receiver portion is aligned with the mounting rail, the clamping portion is capable of providing a first force to the mounting rail via the first component in a direction that is perpendicular to the central axis and a second force via the second component parallel to the central axis such that the combination of the first force and the second force supplied by the first angled portions center the optical sighting apparatus with relation to the mounting rail.

19. The optical sighting apparatus of claim 12, wherein the main body includes at least one of a carbon fiber, carbon fiber reinforced plastic, poly-para-phenylene terephthalamide, glass-reinforced plastic, glass-fiber reinforced plastic.

20. The optical sighting apparatus of claim 12, wherein the mounting portion includes at least one of a carbon fiber, carbon fiber reinforced plastic, poly-para-phenylene terephthalamide, glass-reinforced plastic, glass-fiber reinforced plastic, polyether ether ketone, reinforced polyether ether ketone, polyetherimide, reinforced polyetherimide, or reinforced nylon.

21. The optical sighting apparatus of claim 12, wherein said clamping portion comprises:
   a threaded hole;
   a threaded bolt capable of being threaded into the threaded hole;
   a retainer portion for preventing the threaded bolt from separating from the threaded hole.

22. The optical sighting apparatus of claim 12, wherein the mounting portion further comprises a recoil stop, wherein the recoil stop comprises:
   a through hole through the mounting portion, the through hole having an axis perpendicular to the central axis, wherein the through hole is capable of receiving a recoil pin.

23. The optical sighting apparatus of claim 12, wherein the mounting portion comprises a plurality of recoil grooves, wherein the plurality of recoil grooves comprises:
   a series of square cross-sectionally shaped notches extending from the mounting rail, the series of notches being capable of interoperating with a recoil stop.

* * * * *